United States Patent [19]

Graham et al.

[11] 4,231,778

[45] Nov. 4, 1980

[54] METHOD OF STRENGTHENING GLASS ARTICLES

[75] Inventors: Paul W. L. Graham, Toledo; Thomas W. Moore, Jr., Perrysburg, both of Ohio

[73] Assignee: Owens-Illinois, Inc., Toledo, Ohio

[21] Appl. No.: 40,606

[22] Filed: May 18, 1979

[51] Int. Cl.³ .................... C03B 29/00; C03B 32/00
[52] U.S. Cl. ............................. 65/117; 65/120
[58] Field of Search ................... 65/28, 120, 117

[56] References Cited

U.S. PATENT DOCUMENTS

| | | | |
|---|---|---|---|
| 1,852,840 | 4/1932 | Fuwa et al. | 65/120 |
| 2,073,144 | 3/1937 | Darrah | 65/120 |
| 2,507,433 | 5/1950 | Borchert et al. | 65/120 |
| 3,259,480 | 7/1966 | Michalik et al. | 65/28 |
| 3,531,272 | 9/1970 | Menear | 65/120 X |
| 3,708,273 | 1/1973 | Mitchell | 65/120 |

*Primary Examiner*—Arthur D. Kellogg

*Attorney, Agent, or Firm*—E. J. Holler; M. E. Click; D. H. Wilson

[57] ABSTRACT

This invention relates to a process for strengthening glass articles immediately after their formation and prior to annealing to remove stresses, and more specifically to increasing the strength of glass containers in terms of internal pressure retention as well as in thermal shock and impact resistance. The process involves allowing the newly-formed glass containers to cool down to a limited extent immediately subsequent to their formation, subjecting the defect-bearing exterior surfaces of the glass containers, which contain surface checks or cracks, to an elevated temperature for a brief period of time to physically alter the crack geometry of the defects and partially heal the same, and then annealing the glass containers to remove stresses therefrom. The glass containers then exhibit a strengthening of at least 10 to 20 percent, and in some cases as much as a 50 percent increase over their average untreated strength based on internal pressure strength tests which are indicative of overall strengthening of glass surfaces.

12 Claims, No Drawings

METHOD OF STRENGTHENING GLASS ARTICLES

BACKGROUND OF THE INVENTION

Prior research in the crack healing of glass has indicated that fracture is a partially reversible process and that cracks in glass surfaces can be propagated or healed by controlling the applied load. The reason for the reversible nature of the bonding process appears to reside primarily in the characteristics of the crack tip. It is the thought that atomic forces acting across the crack tip tend to pull crack surfaces into realignment, thus re-establishing contact over the entire crack plane. Although crack healing in single crystals has been reported, it is an infrequently-observed phenomenon.

Some evidence of crack closure in glass has been reported. Most commonly when cracks do occur in glass, their healing or closure does not fully result or is incomplete due to films absorbed on the crack surfaces. With regard to strength recovery, it is occasionally possible to obtain 80% of the original strength, depending upon conditions of fracture and recovery.

In some cases, cracks in soda-lime glass samples have been found to close spontaneously. About 80% strength was recovered in cracks formed by mechanical shock while about 20% was recovered in cracks which closed after being held open for several minutes. The high strength recovery in mechanically-shocked samples is considered traceable to the very active surface formed by fracture. When the surface is allowed to adsorb oxygen or water vapor, the surface activity is decreased and the resultant healing is less complete. Such studies have been reported in the paper entitled, "Crack Healing In Glass", by S. M. Weiderhorn and P. R. Townsend presented at the 72nd Annual Meeting, the American Ceramic Society, May 6, 1970 (Glass Division, No. 33-G-70).

It is also possible to strengthen glass by fire polishing or fire glazing whch is carried out by directing flames onto the glass surface to heat soften or melt the same. Such procedure may be useful in working certain types of glass products, but in the case of glass containers and other precisely-formed glass articles, very special care must be taken not to deform localized regions of the glass sidewalls or the neck and finish portions which deformation can result in other defects.

SUMMARY OF THE INVENTION

The present invention permits the strengthening of glass containers or other glass articles by healing or partially healing of frequently-occurring defects such as checks or small cracks in glass surfaces which are extremely deleterious to normal strength. The present procedure permits strengthening the glass articles in a very short period of time compared with the prior art. The method provides an ability to heal or partially heal checks or small cracks in a brief period of time, generally from 1 to 4 seconds or a few minutes, depending upon the procedure selected. The strength of glass bottles or jars containing checks can be increased by treating the checked area with a flame from a torch for a few seconds or by placing the bottles or jars in a hot oven for a few minutes, the treated bottles or jars showing a strength increase of from 10 to 50 percent over their original untreated strength.

DESCRIPTION OF THE PREFERRED EMBODIMENT

The glass bottles or jars are preferably treated very shortly after their being formed by conventional glass forming machines. The newly-formed glass containers are treated by a method which is substantially different from the fire polishing technique which involves visible melting or softening the surfaces to at least some degree. The present method does not melt or soften the overall glass surface to any significant degree, but is thought to place the check or crack surfaces in a state of compression which alters their behavior.

In a demonstration of this invention wherein soda-lime glass bottles were manufactured, the bottles were picked up shortly after being removed from the forming machine and held for a slow count of 15 or 25, which corresponded to approximately 15 to 25 seconds, respectively, such periods of time allowing the bottle surface to cool down to a temperature ranging from about 800° to 1100° F. in the case of soda-lime glass containers. Selected surfaces of the bottles were then stroked using moderate pressure with a piece of ⅛ inch cold-rolled steel rod which was preferably at or near ambient temperature. The rod contacting surface was previously roughened by abrading it longitudinally with 320 grit emery cloth. The rod thus served to form a check or checks in the contacted glass surface.

If the bottle was intended to be a control sample, it was placed directly in the lehr. If the bottle was to be a test sample, it was either placed in an oven for the required period or the checked area was treated with a torch and then the bottle was placed in the lehr. The oven in this case was a standard Blue M recirculating oven which attained a temperature of at least 1325° F. The selected torch was a hand-held air-aspirating propane-burning 180,000 BTU model torch.

Temperature measurements of the bottles was preferably made immediately after their surfaces were checked with the ⅛ inch steel rod, and then if the bottles were test samples, immediately after their being removed from the oven or from the torch flame. Some lag time normally occurred in obtaining the temperature readings due to the time required to handle each bottle. The temperature data obtained should not be regarded as absolute, but merely indicative of the bottle temperatures at the indicated time. An Ircon I-R pyrometer was used to measure these temperatures.

The test data showed that the artificially-produced checks in the sidewalls of the newly-formed bottles were strengthened by both of the two different techniques involving heat. The data indicated that when checked bottles were treated with a 180,000 BTU air-aspirating propane torch for periods as short as one second, and then placed in a lehr, a strengthening in internal pressure strength ranging from about a 10 to 50 percent increase resulted, depending upon the duration of treatment with the torch and the bottle initial strengths.

Further, the data showed that when checked bottles were treated at about 1200° F. in an oven for periods as short as two minutes, and then placed in a lehr, a srengthening by a factor of about 20 to 50 percent resulted. It was found that little or no strengthening resulted when the checked bottles were subjected to the 1200° F. temperatures for the shorter period of about one minute or less in an oven, or when subjected to the lower temperature of about 1150° F. for a period of about four minutes in an oven.

The subject treatments did not constitute a fire polishing because the combination of surface temperature and time of heating were not sufficient to cause the surface to flow to any appreciable or visible extent as observed in fire polishing. In the present treatment, the checks still remained but were altered to a strengthened state. The check or crack surfaces were seemingly thrown into a state of compression which acted to force the highly-reactive fracture surfaces together. In the same manner, the crack geometry was changed, especially with respect to the crack depth or crack tip radius. It may very well be that the rate of heat transfer was involved significantly in achieving the compression.

EXAMPLE I

In the subject test, the soda-lime glass containers were taken very shortly after forming and subjected to a countdown period to allow the bottles to cool for about a 25 second count. The bottles were the short 12-ounce steinie-shaped beer bottles which are used as non-returnable containers. The checked areas of the bottles were then rapidly heated with a torch flame for periods varying from 1, 2 and 3 seconds after their surfaces were intentionally checked. The bottles were dead annealed and then subjected to internal pressure strength breakage tests. Column 1 lists the average breaking strength and the lowest breaking strength for the control bottles. The temperature of the bottles after checking was also taken. Columns 2, 3 and 4 list the same data for the test bottles which were subjected to direct torch flame for 1, 2 and 3 seconds, respectively, in their treatment, and in addition the temperature was taken after heating. The marked increase in breaking strength due to the heating treatment was apparent. The bottles showed a strength increase after treatment of from about 20 to 60 percent of their original untreated strength based on the control bottles.

|  | Control | 1 Sec. Torch | 2 Sec. Torch | 3 Sec. Torch |
|---|---|---|---|---|
| Average Breaking Pressure (psig) | 201 | 244 | 279 | 273 |
| Lowest Breaking Pressure (psig) | 149 | 202 | 242 | 192 |
| Temperature After Checking (°F.) | 1045° | 1045° | 1040° | 1070° |
| Temperature After Heating (°F.) | — | 1055° | 1100° | 1160° |

EXAMPLE II

In this test, the same type of bottles were taken directly from the forming machine and subjected to the same 25 second count-down. The control samples were subjected to the same internal pressure breaking tests as in Example I. The test bottles were subjected to rapid heating using the torch flame for periods of 5 and 8 seconds. The test samples showed a substantial increase in strength over the control samples.

|  | Control | 5 Sec. Torch | 8 Sec. Torch |
|---|---|---|---|
| Average Breaking Pressure (psig) | 88 | 316 | 316 |
| Lowest Breaking Pressure (psig) | 73 | 144 | 178 |

Both Examples I and II indicated the level of strengthening obtainable in soda-lime glass containers which were treated in the checked areas as indicated using a torch in accordance with this invention.

EXAMPLE III

In this test, the soda-lime glass containers were similarly taken shortly after forming and subject to a count-down period to allow the bottles to cool for about a 15 second count. The bottles were then rapidly heated in an oven maintained at a temperature of 1145° for a 4 minute period. Only a limited increase in strength was shown in the collected data.

|  | Control | 1145° 4 min. |
|---|---|---|
| Average Breaking Pressure (psig) | 187 | 196 |
| Lowest Breaking Pressure (psig) | 118 | 135 |
| Temperature After Checking (°F.) | 895° | 930° |
| Temperature After Heating (°F.) | — | 1070° |

EXAMPLE IV

In this test, the soda-lime glass containers were taken shortly after forming and subjected to a 15 second count-down period similar to Example III. The bottles were then placed in an oven maintained at a temperature of 1200° F. for periods of time of 1 minute, 2 minutes, and 4 minutes. The increase in strength compared with the control samples is shown in the listed data. The 4 minute treatment indicated the greatest increase in relative strength.

|  | Control | 1200° 1 min. | Control | 1200° 2 min. | Control | 1200° 4 min. |
|---|---|---|---|---|---|---|
| Average Breaking Pressure (psig) | 150 | 167 | 163 | 213 | 138 | 237 |
| Lowest Breaking Pressure (psig) | 100 | 123 | 100 | 163 | 100 | 173 |
| Temp. After Checking (°F.) | 965° | 975° | 975° | 975° | 955° | 940° |
| Temp. After Heating (°F.) | — | 1045° | — | 1085° | — | 1110° |

EXAMPLE V

In this test, the same soda-lime glass containers were subjected to thermal shock strength tests after treatment with the propane torch for flame impingement times of 5 and 10 seconds. Control bottles were tested in the same manner as the treated bottles. The data indicated the number of bottles broken in the thermal shock tests involving temperature differentials of 75° F. and 80° F. The longer exposure time of 10 seconds to the elevated temperature indicates a marked increase in strength as resistance to thermal shock breakage.

|  | Test Bottles #Broken | Control Bottles #Broken |
| --- | --- | --- |
| 5 Seconds With Torch 75° F. Thermal Shock Differential | 4 of 12 | 9 of 12 |
| 85° F. Thermal Shock Differential | 12 of 12 | 12 of 12 |
| 10 Seconds With Torch 75° F. Thermal Shock Differential | 0 of 12 | 6 of 12 |
| 80° F. Thermal Shock Differential | 3 of 12 | 12 of 12 |

The aforesaid various forms of treatment have provided a means of strengthening newly-formed glass articles to a significant degree. While the tests were conducted using glass containers immediately after their forming, the methods are adapted to being readily applied to other forms of glass articles. The process is easily utilized without major changes in present glass forming processes. The process is most economical in view of the strength increases which are attainable.

Various modifications may be resorted to within the spirit and scope of the appended claims.

I claim:

1. The method of strengthening newly-formed glass articles having surface defects in their exterior surfaces comprising the steps of allowing the said newly-formed glass articles to partially cool immediately following their formation, immediately rapidly heating the defect-containing newly-formed exterior surfaces of said articles to an elevated temperature ranging from about 1000° to 1250° F. for a period of time ranging from about 1 second to about 6 minutes, depending upon selection of the heat source, said time period being less than that which would cause visible softening or fusing of the said exterior surfaces, and then annealing said glass articles to remove stresses therefrom.

2. The method in accordance with claim 1, wherein the geometry of the surface defects in said exterior surfaces is altered by such rapid heating.

3. The method in accordance with claim 1, wherein the said surface defects in said exterior surfaces are subjected to direct flame from a torch for a period of from about 1 to 10 seconds.

4. The method in accordance with claim 1, wherein the said glass articles are passed through an oven for subjection to the elevated temperature for a period of from 1 to 6 minutes.

5. The method in accordance with claim 1, wherein the said glass articles are strengthened ranging from about 10 to 50 percent or more than their original strength as indicated by internal pressure strength tests.

6. The method in accordance with claim 1, wherein at least some of the said surface defects in said exterior surfaces remain visible after treatment but are considerably strengthened due to a geometry change.

7. The method in accordance with claim 1, wherein the said surface defects in said exterior surfaces are subjected to an elevated temperature of about 1200° F. for a period of about 4 seconds.

8. The method in accordance with claim 1, wherein said glass articles comprise soda-lime glass containers.

9. The method of strengthening newlyformed soda-lime containers having surface defects in their exterior surfaces comprising the steps of allowing the said newly-formed glass containers to cool to a temperature ranging from about 800° to 1100° F. immediately following their formation, immediately rapidly heating the defect-bearing, newly-formed exterior surfaces of said containers to a temperature ranging from about 1000° to 1250° F. for a period of time of about 1 to 4 seconds, said time period being less than that which would cause visible softening or fusing of said glass surfaces, and then annealing said glass containers to remove stresses therefrom, at least some of said defects remaining visible in said defect-bearing exterior surfaces, thereby significantly strengthening said glass containers by about 10 to 50 percent greater than their original strength as indicated by internal pressure strength tests.

10. The method in accordance with claim 9, wherein the said defect-bearing exterior surfaces are subjected to direct flame for the stated period.

11. The method in accordance with claim 9, wherein the defect-bearing exterior surfaces of said glass containers are heated with direct flame from a gas-fired torch for the stated period.

12. The method of strengthening newly-formed soda-lime glass containers having surface defects in their exterior surfaces comprising the steps of allowing the said newly-formed glass containers to cool to a temperature ranging from about 800° to 1100° F. immediately following their formation, immediately rapidly heating the defect-bearing newly-formed exterior surfaces of said containers to a temperature ranging from about 1000° to 1250° F. for a period of time of about 1 to 6 minutes in an oven, said time period being less than that which would cause visible softening or melting of said glass surfaces, and then annealing said glass containers to remove stresses therefrom, at least some defects remaining visible in said defect-bearing exterior surfaces, thereby significantly strengthening said glass containers by about 10 to 50 percent greater than their original strength as indicated by internal pressure strength tests.

* * * * *